US006942721B2

(12) United States Patent
Oh et al.

(10) Patent No.: US 6,942,721 B2
(45) Date of Patent: Sep. 13, 2005

(54) CANISTER FOR MOTOR VEHICLE

(75) Inventors: Won-suk Oh, Seoul (KR); Ki-kyung Bea, Ansung (KR); Hyun-ki Kim, Pyeongtaek (KR)

(73) Assignee: Korea Fuel-Tech Corporation, Ansung (KR)

( * ) Notice: Subject to any disclaimer, the term of this patent is extended or adjusted under 35 U.S.C. 154(b) by 154 days.

(21) Appl. No.: 10/655,184

(22) Filed: Sep. 4, 2003

(65) Prior Publication Data

US 2004/0206240 A1 Oct. 21, 2004

(30) Foreign Application Priority Data

Apr. 18, 2003 (KR) ................................. 10-2003-0024668

(51) Int. Cl.$^7$ ........................ B01D 53/04; F02M 33/02
(52) U.S. Cl. ........................ 96/135; 96/137; 96/139; 96/147; 96/149; 96/152; 96/153; 55/385.3; 123/519
(58) Field of Search .......................... 96/108, 134–139, 96/143, 144, 147, 149, 151–153; 55/385.3; 123/518–520

(56) References Cited

U.S. PATENT DOCUMENTS

| | | | | |
|---|---|---|---|---|
| 3,172,348 A | * | 3/1965 | Berg | 454/162 |
| 3,221,724 A | * | 12/1965 | Wentworth | 123/519 |
| 4,137,882 A | * | 2/1979 | Thornburgh | 123/520 |
| 4,655,189 A | * | 4/1987 | Koga | 96/136 |
| 4,658,796 A | * | 4/1987 | Yoshida et al. | 123/519 |
| 4,683,862 A | * | 8/1987 | Fornuto et al. | 123/520 |
| 4,713,100 A | * | 12/1987 | Haruna et al. | 96/143 |
| 4,714,485 A | * | 12/1987 | Covert et al. | 96/143 |
| 4,732,588 A | * | 3/1988 | Covert et al. | 96/144 |
| 4,750,465 A | * | 6/1988 | Rediker et al. | 123/519 |
| 4,853,009 A | * | 8/1989 | Turner et al. | 96/144 |
| 4,894,072 A | * | 1/1990 | Turner et al. | 96/130 |
| 5,119,791 A | * | 6/1992 | Gifford et al. | 123/519 |
| 5,304,235 A | * | 4/1994 | Watanabe et al. | 96/144 |
| 5,641,344 A | * | 6/1997 | Takahashi et al. | 96/139 |
| 5,910,637 A | * | 6/1999 | Meiller et al. | 96/135 |
| 5,961,699 A | * | 10/1999 | Sung | 96/135 |
| 2002/0007826 A1 | * | 1/2002 | Yamada et al. | 123/519 |
| 2002/0026874 A1 | * | 3/2002 | Ikuma et al. | 96/144 |
| 2005/0045160 A1 | * | 3/2005 | Peterson et al. | 123/519 |

FOREIGN PATENT DOCUMENTS

EP 0556488 A1 * 8/1993

* cited by examiner

Primary Examiner—Robert H. Spitzer
(74) Attorney, Agent, or Firm—Michael J. Striker

(57) ABSTRACT

Disclosed is a canister for a motor vehicle. A liquid trap provided to an upper surface of a canister body is formed to have a circular configuration. A plurality of intake pipe nozzles are connected at an angle to a guide pipe which is installed through a center portion of the liquid trap, such that the intake pipe nozzles extending in a radial direction are separated one from another by a predetermined angle along a circumferential direction. A bottom wall of the liquid trap is formed such that an upper surface of the bottom wall is inclined downward from a center portion thereof toward an edge portion thereof. A diffusion device is disposed directly below the liquid trap to uniformly distribute evaporated gas to be introduced into the canister body.

11 Claims, 4 Drawing Sheets

CANISTER FOR MOTOR VEHICLE

BACKGROUND OF THE INVENTION

1. Field of the Invention

The present invention relates, in general, to a canister for a motor vehicle and, more particularly, to a canister for a motor vehicle, in which a liquid trap provided to an upper surface of a canister body is formed to have a circular or an elliptical configuration to thereby allow easy mounting of the canister to the motor vehicle, and a plurality of intake pipe nozzles are installed in the liquid trap to extend in various directions so that liquid fuel collected in the liquid trap can be supplied to an engine along with adsorbed gas filled in the canister body.

2. Description of the Prior Art

As well known to those skilled in the art, a canister for a motor vehicle is used in a manner such that evaporated gas generated in a fuel tank of the motor vehicle is adsorbed and stored by activated charcoal provided in the canister and then the resultant adsorbed gas is supplied to an engine to be ignited, whereby fuel loss in the fuel tank can be minimized.

That is to say, in order that evaporated gas generated in the fuel tank while the engine is stopped is collected and thereby prevented from being discharged to the outside, the canister is provided with the activated charcoal. As a consequence, the evaporated gas is adsorbed by the activated charcoal, and only air flows into and out of the canister through an air inlet and outlet pipe which communicates with the outside.

A liquid trap having a quadrangular configuration is provided on an upper surface of a canister body. The liquid trap is formed with an inlet pipe which is connected with a fuel tank and a guide pipe through which the adsorbed gas collected in the canister is supplied into the engine by negative pressure developed in the engine.

However, the conventional canister constructed as mentioned above suffers from defects in that, since the liquid trap has the quadrangular configuration, it is not easy to mount the canister to the motor vehicle, and since only one intake pipe nozzle is formed in the liquid trap, it is difficult to efficiently supply liquid fuel and adsorbed gas collected and adsorbed in the canister to the engine.

SUMMARY OF THE INVENTION

Accordingly, the present invention has been made keeping in mind the above problems occurring in the prior art, and an object of the present invention is to provide a canister for a motor vehicle, in which a liquid trap provided to an upper surface of a canister body is formed to have a circular or an elliptical configuration to thereby allow easy mounting of the canister to the motor vehicle, in which a plurality of intake pipe nozzles are connected to a guide pipe in the liquid trap in such a way as to extend in various directions so that liquid fuel collected in the liquid trap can be efficiently supplied to an engine along with gas adsorbed by activated charcoal, and in which a diffusion device is installed to allow evaporated gas introduced into the canister body to be sufficiently adsorbed by the activated charcoal so that the canister can be adapted for a low emission vehicle.

In order to achieve the above object, according to one aspect of the present invention, there is provided a canister for a motor vehicle, wherein a liquid trap provided to an upper surface of a canister body is formed to have a circular configuration of a predetermined height; a plurality of intake pipe nozzles are connected at an angle to a guide pipe which is installed through a center portion of the liquid trap, such that the intake pipe nozzles extending in a radial direction are separated one from another by a predetermined angle along a circumferential direction; a bottom wall of the liquid trap is formed such that an upper surface of the bottom wall is inclined downward from a center portion thereof toward an edge portion thereof; and a diffusion device is disposed directly below the liquid trap to maintain the evaporated gas to be introduced into the canister body for a predetermined time and allow the evaporated gas to be adsorbed by activated charcoal while being uniformly distributed over the canister body.

According to another aspect of the present invention, the diffusion device is formed, through a bottom wall thereof, with a plurality of holes, and an inlet guide flange which is formed on an upper wall of the diffusion device projects into a space defined in the diffusion device.

According to another aspect of the present invention, the number of the intake pipe nozzles is determined as 2 to 6. By this fact, even when the canister is inclined to force the liquid fuel contained therein to one side, the liquid fuel can be reliably sucked and supplied to the engine along with the gas adsorbed by the activated charcoal.

According to another aspect of the present invention, the upper surface of the bottom wall of the liquid trap has an inclination angle of 1~3 degrees. Hence, as the center portion of the upper surface is positioned higher than the edge portion of the upper surface, liquid fuel can flow downward to be collected adjacent to the edge portion. Also, due to the fact that a region where the intake pipe nozzle is connected to the guide pipe is positioned higher by a predetermined distance than a lower end of the guide pipe, negative pressure can be sufficiently developed in the guide pipe. Moreover, because a diameter of the intake pipe nozzle is smaller than that of the guide pipe, due to a pressure difference between the intake pipe nozzle and the guide pipe, liquid fuel can be easily supplied to the engine.

It is preferred that the guide pipe has a length of 2~4 cm when measured from an orifice of the intake pipe nozzle to the lower end of the guide pipe, and the intake pipe nozzle has a length of 3~7 cm.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
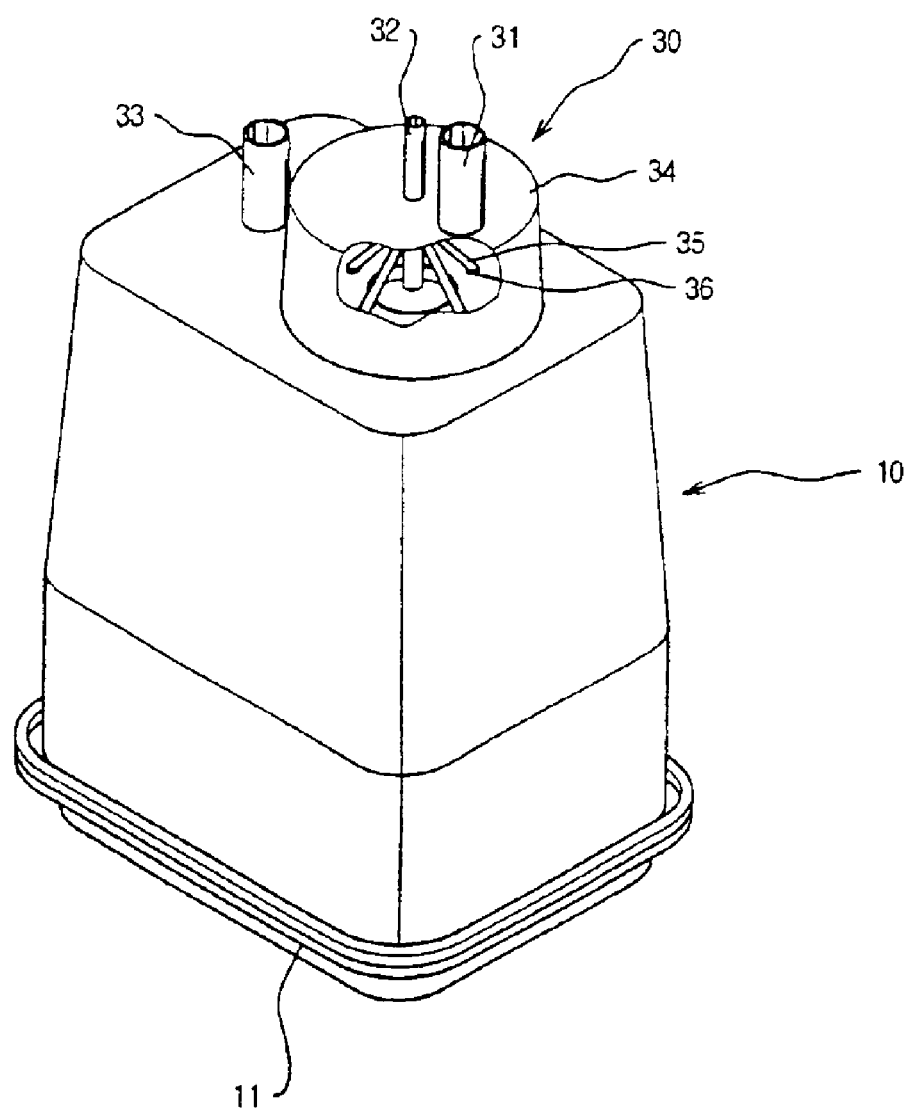
FIG. 1 is a partially broken-away perspective view illustrating a canister for a motor vehicle in accordance with an embodiment of the present invention.

Reference should now be made to the drawings, in which the same reference numerals are used throughout the different drawings to designate the same or similar components.

Figure 2:
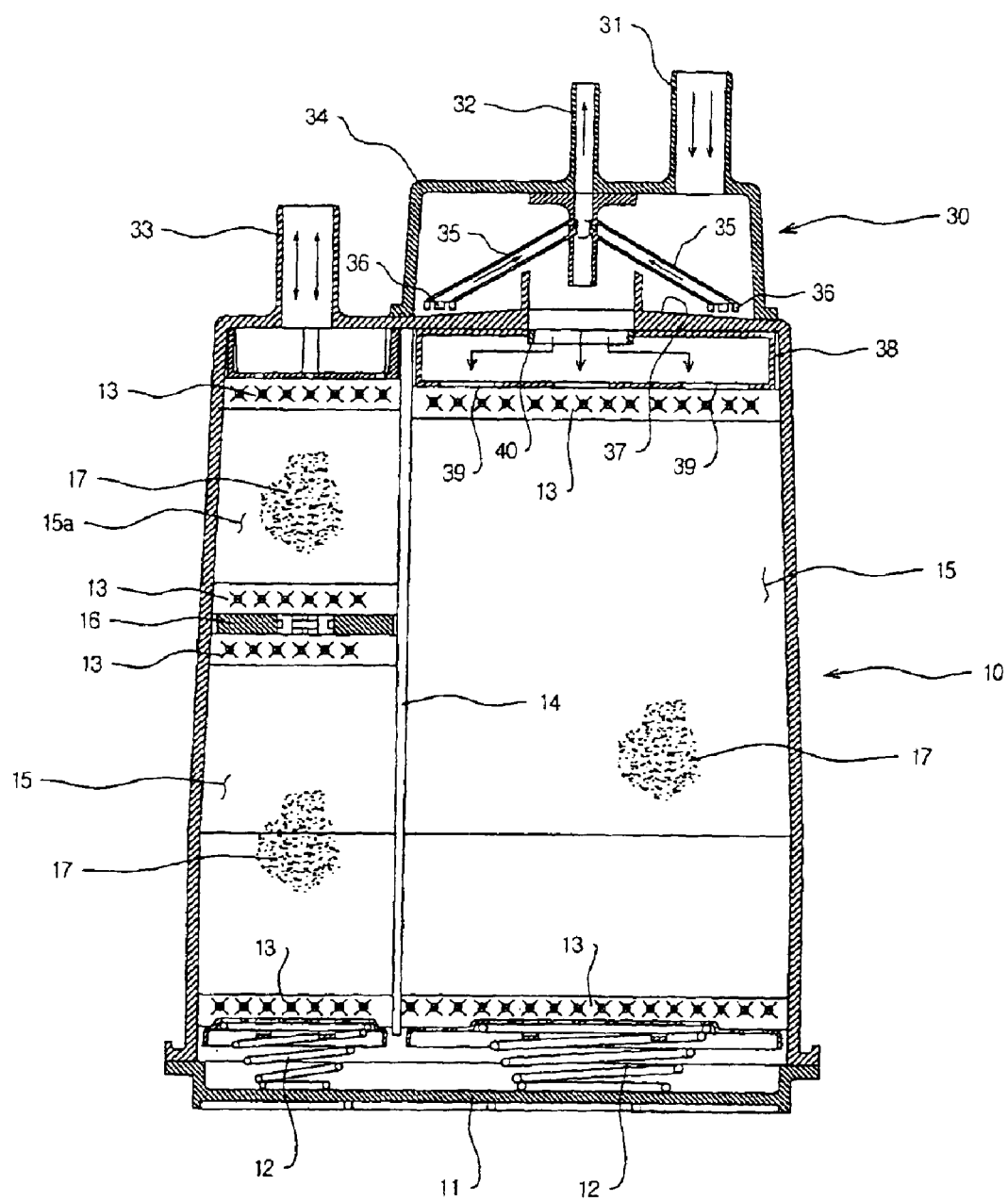
FIG. 2 is a sectional view of the canister according to the present invention.
Figure 3:
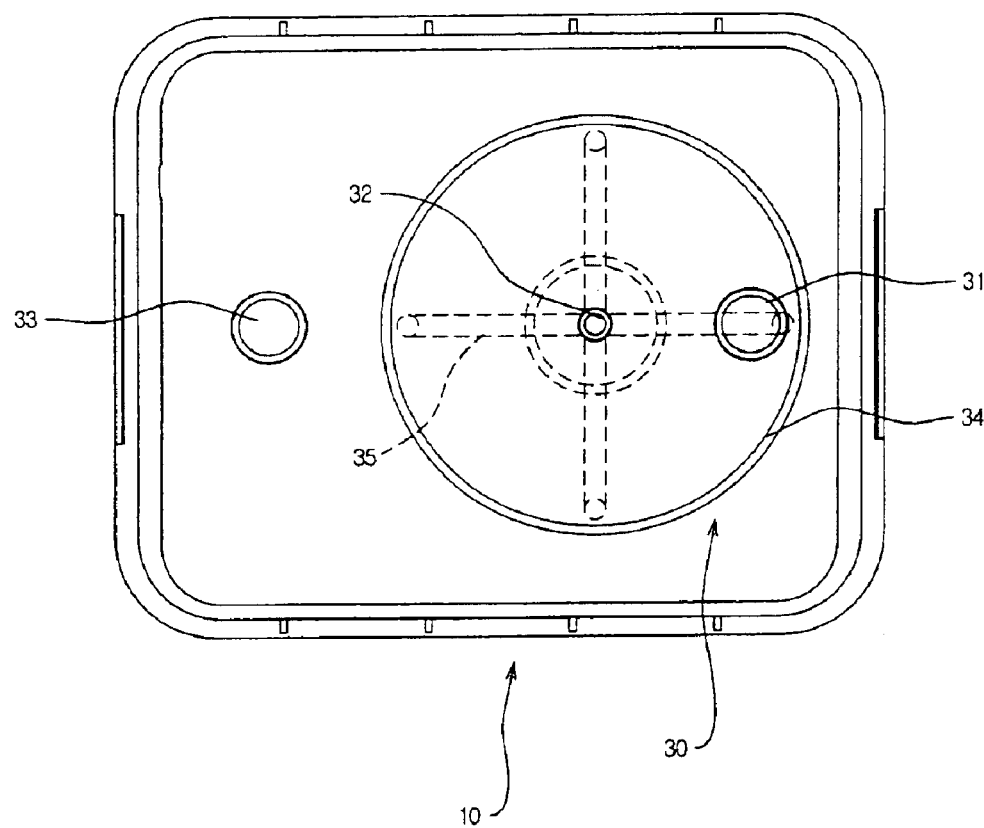
FIG. 3 is a plan view of the canister according to the present invention.
Figure 4:
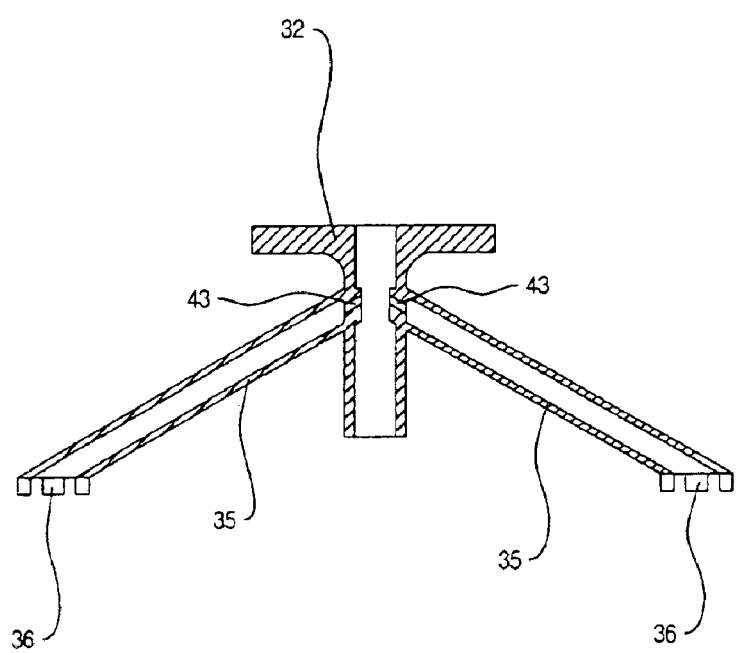
FIG. 4 is a partial enlarged sectional view illustrating an orifice of the canister according to the present invention.

FIG. 1 is a partially broken-away perspective view illustrating a canister for a motor vehicle in accordance with an embodiment of the present invention; FIG. 2 is a sectional view of the canister according to the present invention; FIG. 3 is a plan view of the canister according to the present invention; and FIG. 4 is a partial enlarged sectional view illustrating an orifice of the canister according to the present invention.

As shown in FIGS. 1 through 4, a canister for a motor vehicle in accordance with an embodiment of the present invention comprises a canister body 10, a gas-liquid separator 30 which is fastened to an upper surface of the canister body 10, and a base 11 which supports the canister body 10 to prevent activated charcoal filled in the canister body 10 from being released.

The canister body 10 is formed to have a configuration which is suitable for a mounting position. A lower surface of the canister body 10 is placed on the base 11. Adjacent to a lower end of the canister body 10, the activated charcoal 17 filled in the canister body 10 is placed on foam rubber 13 made of synthetic resin. The foam rubber 13 prevent release of the activated charcoal 17 and allow the activated charcoal 17 to be communicated with air. The foam rubber 13 are placed on conical springs 12.

The conical springs 12 support a great deal of activated charcoal 17 filled in the canister body 10. The conical springs 12 function to protect the canister from shock and vibration generated when vibration-fusing the gas-liquid separator 30 to the canister body 10 and absorb shock and vibration generated while the motor vehicle travels on the road.

The foam rubber 13 made of synthetic resin are separated one from another by a partition wall 14 which is installed in the canister body 10. The foam rubber 13 are attached to upper and lower ends of a first chamber 15 which is filled with the activated charcoal, upper and lower ends of a second chamber 15a, and upper and lower surfaces of a shock-absorbing wall 16.

The foam rubber 13 made of synthetic resin may be replaced with non-woven fabric.

The partition wall 14 divides the inside space of the canister body 10 into a plurality of space portions.

A great amount of activated charcoal 17 for adsorbing evaporated gas generated in a fuel tank of the motor vehicle is filled in the first chamber 15. Different kinds of activated charcoal 17 is filled in the second chamber 15a so that adsorption can be more easily implemented when compared to the activated charcoal 17 filled in the first chamber 15.

Due to the fact that the foam rubber 13 made of synthetic resin are attached to the upper and lower surfaces of the shock-absorbing wall 16, the activated charcoals 17 filled in the first and second chambers 15 and 15a are isolated from each other and prevented from being mixed with each other. The foam rubber 13 also function to prevent the activated charcoal 17 from being broken.

The gas-liquid separator 30 includes a liquid trap 34, a plurality of intake pipe nozzles 35, an inclined bottom wall 37, a plurality of adsorption aids 36, and a plurality of orifices 43.

The gas-liquid separator 30 which is fastened to the upper surface of the canister body 10 by vibration-fusion has an inlet pipe 31 which is connected to the fuel tank (not shown). A guide pipe 32 is installed through a center portion of an upper wall of the liquid trap 34 so that gas adsorbed by the activated charcoals 17 filled in the canister body 10 and liquid fuel collected in the gas-liquid separator 30 can be supplied to an engine through the guide pipe 32.

The guide pipe 32 projects into a space defined in the liquid trap 34. Two to six intake pipe nozzles 35 are connected to a predetermined portion of the guide pipe 32 in a manner such that liquid fuel collected on the inclined bottom wall 37 of the liquid trap 34 can be sucked through the intake pipe nozzles 35 toward the engine.

When measured from the orifice 43 defined in each intake pipe nozzle 35 to a lower end of the guide pipe 32, the guide pipe 32 has a length of 2–4 cm, and, preferably, of 3 cm.

At a region where each intake pipe nozzle 35 is connected to the guide pipe 32, the intake pipe nozzle 35 is defined with the orifice 43 of a decreased diameter in a manner such that the liquid fuel can be easily sucked toward the engine due to a pressure difference existing between the intake pipe nozzle 35 and the orifice 43.

It is preferred that each intake pipe nozzle 35 has a diameter of 2~3 mm. More preferably, each intake pipe nozzle 35 has a diameter of 2.5 mm.

Each adsorption aid 36 is connected to a distal end of each intake pipe nozzle 35 to allow the liquid fuel to be easily sucked into the intake pipe nozzle 35.

The adsorption aid 36 is formed with partitions which are separated one from another by a predetermined interval.

Preferably, the intake pipe nozzle 35 has a length of 4~7 cm. More preferably, the intake pipe nozzle 35 has a length of 5 cm.

It is preferred that the intake pipe nozzles 35 have the number of 2~6.

The liquid trap 34 of the gas-liquid separator 30, which is fusion-coupled to the canister body 10, has the inclined bottom wall 37. That is to say, a center portion of the inclined bottom wall 37 of the liquid trap 34 which is located directly below the guide pipe 32 is positioned higher than an edge portion of the inclined bottom wall 37 of the liquid trap 34 which is fused to the canister body 10.

The inclined bottom wall 37 of the liquid trap 34 has an inclination angle of, preferably, 1~3 degrees and, more preferably, of 2 degrees.

The evaporated gas introduced from the fuel tank into the canister body 10 and the liquid fuel produced by liquefying of the evaporated gas and collected on the inclined bottom wall 37 of the liquid trap 34 can be sucked through the intake pipe nozzles 35 into the guide pipe 32 to be directed toward the engine.

An air inlet and outlet pipe 33 through which air can flow into and out of the canister body 10 is formed integrally with the upper surface of the canister body 10.

A diffusion device 38 which defines a space of a predetermined volume is installed directly below the liquid trap 34 to ensure that the evaporated gas introduced from the fuel tank into the liquid trap 34 is not immediately adsorbed by the activated charcoals and an air resistance is decreased.

The diffusion device 38 has an inlet guide flange 40 which is formed on an upper wall of the diffusion device 38. The inlet guide flange 40 projects to some extent into the space defined in the diffusion device 38 so as to uniformly distribute the evaporated gas introduced into the liquid trap 34 over the entire canister body 10. The diffusion device 38 is formed, through a bottom wall thereof, with a plurality of holes 39, so that the evaporated gas is introduced into the canister body 10 through the plurality of holes 39 while being uniformly distributed.

Figure 5:
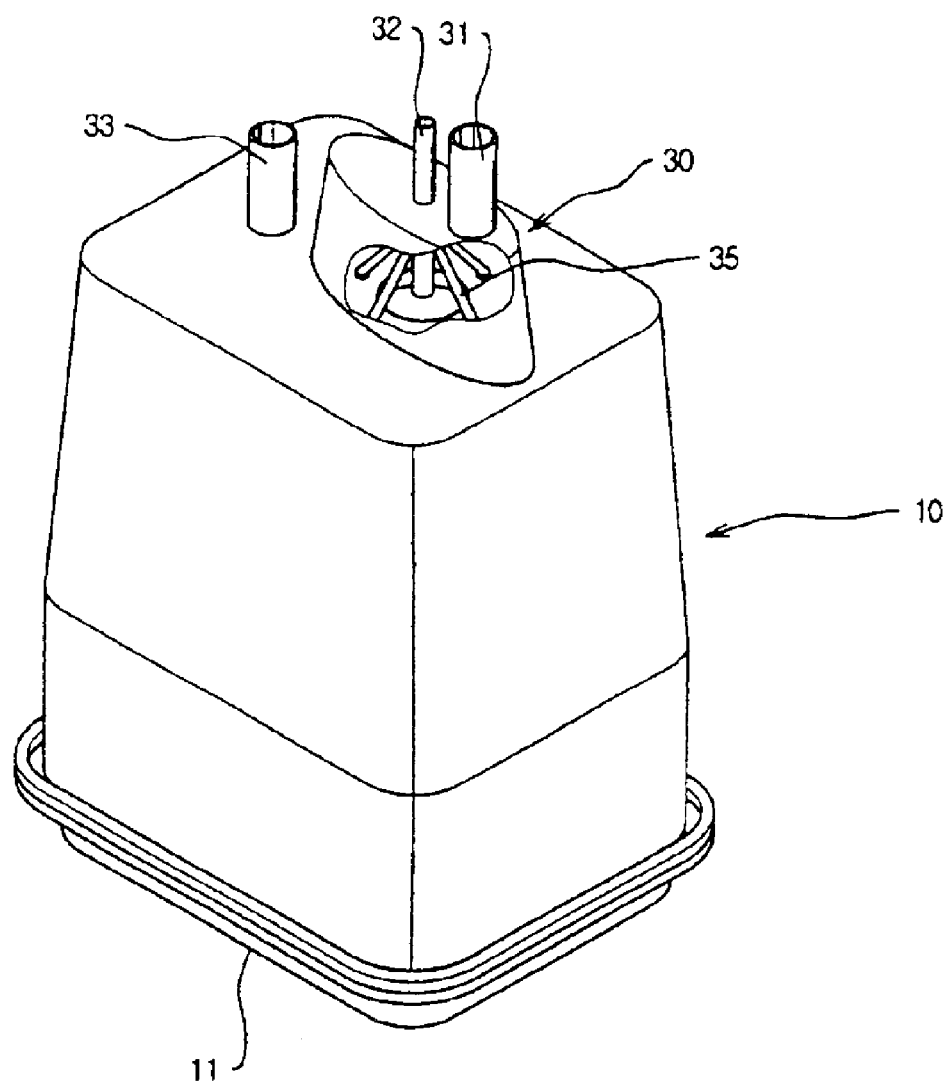
FIG. 5 is a partially broken-away perspective view illustrating a canister for a motor vehicle in accordance with an embodiment of the present invention.

FIG. 5 is a partially broken-away perspective view illustrating a canister for a motor vehicle in accordance with an embodiment of the present invention. In this embodiment of the present invention, except that the gas-liquid separator 30 is formed to have an elliptical configuration rather than the circular configuration, other component elements such as the intake pipe nozzles 35, the adsorption aids 36, the inclined bottom wall 37, the diffusion device 38, and so forth are constructed in the same manner as those in the first embodiment shown in FIG. 2.

As described above, in the canister for a motor vehicle according to the present invention, not only liquid fuel contained in the evaporated gas introduced into the liquid trap 34 from the fuel tank but also the liquid fuel produced due to an abnormal phenomenon are separated in the gas-liquid separator 30. Further, since the diffusion device 38 is installed directly below the gas-liquid separator 30, the evaporated gas introduced into the canister body 10 can be adsorbed by the activated charcoals filled in the canister body 10 while being uniformly distributed.

Also, due to the fact that liquid fuel is collected adjacent to the edge of the inclined bottom wall 37, when the gas adsorbed in the canister is directed through the plurality of intake pipe nozzles 35 connected to the guide pipe 32 toward the engine by virtue of negative pressure developed in the engine, the liquid fuel contained in the gas-liquid separator 30 is simultaneously directed toward the engine to be ignited therein.

Because the plurality of intake pipe nozzles 35 are installed to be separated one from another by a predetermined angle along a circumferential direction, even when the motor vehicle is inclined to force the canister to one side, the liquid fuel can be sucked through at least one intake pipe nozzle 35 which is positioned adjacent to the one side.

As apparent from the above description, the canister for a motor vehicle according to the present invention, constructed as mentioned above, provides advantages in that, since liquid fuel produced due to an abnormal phenomenon as well as liquid fuel contained in evaporated gas are separately collected to be supplied to an engine along with gas adsorbed by activated carbon, operational reliability of the canister is improved. Also, because a plurality of intake pipe nozzles are installed to extend in various directions, even when the canister is inclined to force the liquid fuel contained therein to one side, it is possible to reliably supply liquid fuel to the engine. Further, due to the fact that a liquid trap is formed to have a circular or an elliptical configuration rather than a quadrangular configuration, the canister can be easily mounted to the motor vehicle. Moreover, by the fact that a diffusion device is installed to allow evaporated gas introduced into the canister body to be uniformly distributed and thereby sufficiently adsorbed by the activated charcoal, adsorption efficiency of evaporated gas is elevated.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A canister for a motor vehicle, wherein a liquid trap provided to an upper surface of a canister body is formed to have a circular configuration; a plurality of intake pipe nozzles are connected at an angle to a guide pipe which is installed through a center portion of the liquid trap, such that the intake pipe nozzles extending in a radial direction are separated one from another by a predetermined angle along a circumferential direction; a bottom wall of the liquid trap is formed such that an upper surface of the bottom wall is inclined downward from a center portion thereof toward an edge portion thereof; and a diffusion device is disposed directly below the liquid trap to uniformly distribute evaporated gas to be introduced into the canister body.

2. The canister as set forth in claim 1, wherein the diffusion device is formed, through a bottom wall thereof, with a plurality of holes, and an inlet guide flange which is formed on an upper wall of the diffusion device projects into a space defined in the diffusion device.

3. The canister as set forth in claim 1, wherein the number of the intake pipe nozzles is 2~6.

4. The canister as set forth in claim 1, wherein each intake pipe nozzle has a diameter of 2~3 mm and a length of 3~7 cm.

5. The canister as set forth in claim 1, wherein the upper surface of the bottom wall of the liquid trap has an inclination angle of 1~3 degrees.

6. The canister as set forth in claim 1, wherein lower ends of first and second chambers of the canister body, which are separated from each other by a partition wall, are supported by conical springs, respectively.

7. The canister as set forth in claim 1, wherein the guide pipe projects into a space defined in the liquid trap.

8. The canister as set forth in claim 1, wherein an adsorption aid having partitions which are separated one from another by a predetermined interval is formed at a distal end of each intake pipe nozzle to ensure reliable inflow of liquid fuel into the intake pipe nozzle.

9. The canister as set forth in claim 1, wherein a gas-liquid separator is formed to have an elliptical configuration.

10. The canister as set forth in claim 1, wherein, when measured from an orifice of the intake pipe nozzle to a lower end of the guide pipe, the guide pipe has a length of 2~4 cm.

11. The canister as set forth in claim 1, wherein the diameter of the intake pipe nozzle is measured the same from an inlet thereof to the guide pipe, and is decreased at a region where the intake pipe nozzle is connected with the guide pipe, to have the orifice.

* * * * *